3,378,509
THERMOSETTING HOT MELT COMPOSITIONS COMPRISING HYDROXYL GROUP CONTAINING POLYMER, NORMALLY SOLID SOLVENT AND CROSS-LINKING AGENT
Robert D. Jerabek, Glenshaw, Pa., assignor, by mesne assignments, to Chemical Decoration Company, Glenshaw, Pa., a corporation of Pennsylvania
No Drawing. Filed Aug. 21, 1964, Ser. No. 391,295
8 Claims. (Cl. 260—21)

This invention relates to organic resinous coatings adapted to be applied as a hot melt to the surface of articles of various kinds, particularly as ornamentation or for decorative or protective purposes, and which is thereafter baked at a higher temperature to effect thermosetting of the resin.

The composition of the present invention may be applied to a variety of base materials such as metals, glass, ceramics, plaster, plastics, and can be applied at temperatures ranging between approximately 100° and 200° F. by dipping, spraying, roller coating, screening and stenciling, or other suitable processes, and the resin when cured must be strongly adhered to the base to resist peeling, flaking, separation or crazing.

By way of a specific illustration and not by way of limitation, decorations, either purely ornamental or in the nature of trade-marks, are applied to glass and china by silk screening. Not infrequently there are two or more colors. A hot melt composition is particularly desirable in such multi-color decorations because one color, upon contacting the relatively cold surface of the article, is chilled and solidifies, allowing a succeeding color to be applied without intermediate air drying or baking. Usually it is desirable, if not necessary, that each successive color application have a lower melting temperature than the one previously applied so that the previous coating does not soften while the succeeding one is being applied.

It is important that such hot melt compositions have a reasonably long pot life, i.e., that they will not cure when heated to temperatures between 100° F. and 200° F. too rapidly, but will cure in a short time at higher temperatures. Proper conditions of viscosity, flow control, ability to hold sharp, clearly-defined lines of the pattern at curing temperature, are other required attributes. Heretofore the most successful resinous compositions available for this purpose have been thermplastic resins which are sensitive to heat and may soften or deform even in moderately heated environments to which they are exposed. Thermoplastic compounds so used may also be affected by various chemicals and solvents with which they are likely to be brought into contact in the subsequent use of the articles to which they are applied.

The invention has for its objects to provide an improved hot melt coating composition which is applied hot, but which cools rapidly to enable another coating to be applied thereover; which may be applied by dipping, spraying, roller coating, silk screening or other processes; which is relatively stable to viscosity changes at application temperatures slightly above the melting temperature, i.e., has a prolonged pot life at application temperatures; which, after application, may then be baked at temperatures ranging between about 300° F. and 500° F. to effect thermosetting of the deposited film and without flowing at the baking temperature so as to obliterate or impair the ornamentation. After thermosetting, the coating has the resistance to heat and solvents characteristic of thermosetting resins and may even be overcoated with themselves or with conventional solvent-thinned coatings or otherwise exposed to heat, solvent or use conditions which would be detrimental to thermoplastics now used.

Further objects are to provide such a composition in which are dispersed pigments or soluble dyes and after baking retain bright, lustrous colors, and which is especially useful with metallic powders, such as bronze or aluminum, to give bright metallic lustre.

The present invention provides a thermosetting hot melt decorating medium comprising a resinous binder with a solvent and usually a pigment or dye.

The binder portion of the hot melt compositions described herein contains:

(1) A vinyl chloride, vinyl acetate, vinyl alcohol copolymer resin of the approximate monomer weight ratio of 91/3/6, respectively—such as for example, the commercially available products "Vinylite VAGH" and "Vinylite VAGD."

(2) To this there may or may not be added one or more high molecular weight modifying resins compatible with (1) and used to impart specific properties to the compositions. Such modifiers may control or modify melting temperature, flow or screening properties, and the proportions used may vary widely. Examples of such modifying resins are:

(a) Vinyl copolymer resin comprising vinyl chloride/vinyl acetate of the approximate monomer weight ratio of 87/13, respectively, such for example as "Vinylite VYHH";
(b) Vinyl copolymer resin comprising vinyl chloride/vinyl acetate/maleic acid of the approximate monomer weight ratio of 86/13/1, respectively, such for example as "Vinylite VMCH" or "Vinylite VMCC";
(c) An 80/20 ethyl methacrylate/methyl acrylate copolymer resin such for example as "Acryloid B–82."

(3) One or more compatible plasticizers for (1) and (2) which are used to impart film flexibility. Examples of such plasticizers are epoxidized vegetable oils, chlorinated bi- and ter-phenyls, and low molecular weight phthalate diesters.

(4) One or more compatible compounds containing one or more epoxy oxygen groups used to impart heat stability to the composition during application and post baking. Examples of such materials are epoxidized vegetable oils and olefins as well as glycidyl and polyglycidyl ethers.

(5) A compatible cross-linking agent used to thermoset the composition when baked, by virtue of reaction with hydroxyl and carboxyl groups present. These are from the class of methylolated, etherified melamine, urea and benzoguanamine, particularly those used in coatings. Examples of such materials are monomeric hexamethoxymethylmelamine, diethoxymethylurea, and tetra methoxymethyl benzoguanamine, as well as their ethoxy, propoxy and butoxy homologues, and partially self-condensed resins derived therefrom.

A wide range of binder ingredient types and ratios is possible, as dictated by the type of hot melt thermosetting composition being formulated. Generally the preferred binder ingredient ratios contain 20 to 80% vinyl copolymer resin (1), 0 to 60% modifying resin (2), 5 to 30% plasticizers (3), 2 to 10% epoxy stabilizers (4), and 3 to 10% cross-linking agent (5).

A solvent portion of the hot melt compositions described herein contain:

(1) One or more aromatic hydrocarbons which may be chlorinated, are solvents for the binder, and possess melting points above room temperature. They are used to define the melting point of the composition and control the viscosity of the melt. Examples of such materials are biphenyl, paradichlorobenzene, and naphthalene.

(2) And may contain one or more oxygenated solvents for the binder with boiling points above 300° F. used to promote flow and lower melt viscosities of the hot melt compositions. Examples of such materials are methyl pyrrolidone, butyrolactone, isophorone, methylbenzoate, dimethyl sulfoxide, dimethyl sulfone, and diethylene glycol monobutyl ether acetate.

The preferred composition of the solvents chosen depends upon the choice of binder ingredients, and most often contain 80 to 100% hydrocarbon (1), and 0 to 20% oxygenated solvent (2). The solvents are used in such proportion as to dissolve the hot melt composition binder but retain the melting point of the composition above that of room temperature, i.e., 77° F.

Preferred hot melt thermosetting compositions described herein vary quite widely in overall ingredient ratios, dependent upon ingredients chosen, but generally contain from 20 to 50% binder, 20 to 60% solvent, and 0 to 40% pigment or dye. Following are some typical examples.

EXAMPLE 1.—WHITE

Part A

| | Parts by weight |
|---|---|
| Epoxidized soyabean oil (Admex 710) | 10.0 |
| Chlorinated biphenyl (Aroclor 1254) | 10.0 |
| Rutile titanium dioxide (Titanox RA51) | 60.0 |
| Ultramarine blue (UXI-51) | 0.1 |
| Bisphenol-polyglycidyl ether (DER-331) | 4.0 |
| Hexamethoxymethylmelamine (Cymel 300) | 4.0 |

Part B

| | Parts by weight |
|---|---|
| Part A dispersion | 8.8 |
| Methylpyrrolidone | 0.5 |
| Butyrolactone | 0.5 |
| Naphthalene | 10.0 |
| Vinyl copolymer resin (91/3/6 chloride/acetate/alcohol Vinylite VAGD) | 4.5 |
| Total | 24.3 |

Ten parts of epoxidized soyabean oil (Admex 710), 10 parts chlorinated biphenyl (Aroclor 1254), 60 parts rutile titanium dioxide, 0.1 part ultramarine blue, 4 parts bisphenol-polyglycidyl ether (DER-331), and 4 parts hexamethoxymethylmelamine (Cymel 300) were mixed in a small container and then given two passes on a three-roll paint mill to produce Part A pigmented paste. Into a 50 ml. beaker which was placed on a 175° F. electrically heated hotplate was added 0.5 part methylpyrrolidone, 0.5 part butyrolactone, 10 parts naphthalene, and 4.5 parts vinyl copolymer resin (Vinylite VAGD). The mixture was stirred until all resin particles were dissolved and then 8.8 parts of Part A pigmented paste was blended into the resin solution to give the finished Part B hot melt thermosetting composition with a melting point of approximately 147° F. The composition was tack-free at room temperature, stable for more than one hour at 175° F., yet thermoset when baked for five minutes at 450° F.

EXAMPLE 2.—RED

Part A

| | Parts by weight |
|---|---|
| Permanent red 2B (X-2218) | 5.0 |
| Flow control additive (NUVIS #2) | 0.5 |
| Epoxidized soyabean oil (Admex 710) | 5.0 |
| Chlorinated biphenyl (Aroclor 1254) | 5.0 |
| Hexamethoxymethylmelamine (Cymel 300) | 2.0 |
| Bisphenol-polyglycidyl ether (DER-331) | 2.0 |

Part B

| | Parts by weight |
|---|---|
| Molybdate orange (4403) | 20.0 |
| Flow control additive (NUVIS #2) | 0.5 |
| Epoxidized soyabean oil (Admex 710) | 5.0 |
| Chlorinated biphenyl (Aroclor 1254) | 5.0 |
| Hexamethoxymethylmelamine (Cymel 300) | 2.0 |
| Bisphenol-polyglycidyl ether (DER-330) | 2.0 |

Part C

| | Parts by weight |
|---|---|
| Part A paste | 1.95 |
| Part B paste | 3.45 |
| Methylpyrrolidone | 0.50 |
| Para-dichlorobenzene | 4.00 |
| Biphenyl | 6.00 |
| Vinyl copolymer resin (91/3/6 chloride/acetate/alcohol Vinylite VAGD) | 4.50 |
| Total | 20.40 |

Ingredients listed under Part A were premixed and dispersed on a three-roll paint mill to give a red pigmented paste. Likewise, the ingredients listed under Part B were used to prepare an orange pigmented paste.

Into a 50 ml. beaker which was placed on a 175° F. electrically heated hot plate was added 0.5 part methylpyrrolidone, 4.0 parts paradichlorobenzene, 6.0 parts biphenyl, and 4.5 parts vinyl copoylmer resin (Vinylite VAGD). The mixture was stirred until all resin particles were dissolved and then 1.95 parts red paste Part A, and 3.45 parts orange paste Part B were blended into the resin solution to give the finished Part C hot melt thermosetting composition possessing a melting point of approximately 115° F.

This red hot metal composition was hot screened on a glass container that had previously been decorated with a white hot melt composition as shown in succeeding example Number 5. The decorated container was then baked at 420° F. for five minutes to give a high gloss adherent coating.

EXAMPLE 3.—WHITE

| | Parts by weight |
|---|---|
| Vinyl copolymer resin (91/3/6 chloride/acetate/alcohol Vinyl VAGD) | 1.5 |
| Vinyl copolymer resin (86/13/1 chloride/acetate/maleic acid Vinylite VMCC) | 1.5 |
| Hexamethoxymethylmelamine (Cymel 300) | 0.2 |
| Epoxidized soyabean oil (Admex 710) | 0.8 |
| 3,4 epoxy-cyclohexyl-tri-methoxysilane (Y-4086) | 0.2 |
| Biphenyl | 9.0 |
| Butyrolactone | 1.0 |
| Methyl benzoate | 0.2 |
| 80/20 titanium dioxide/vinyl copolymer resin chips [1] | 7.5 |
| Total | 21.9 |

[1] A commercial dispersion of TiO$_2$ using an 87/13 vinyl chloride/acetate resin (Vinylite VYHH).

In Example 3, part of the modifying resin is provided by the 87/13 vinyl chloride of the resin chips.

Into a 50 ml. beaker which was placed on a 175° F. electrically heated hot plate was added all the ingredients shown excepting the last i.e., the vinyl-TiO$_2$ chips and this mixture stirred until the resins were dissolved. The titanium dioxide-vinyl resin chips were then added and the mixture again stirred until a smooth paste was obtained. This finished white hot melt thermosetting composition was stable for more than one hour at 175° F. and produced glossy thermoset films when baked for five minutes at 400° F.

EXAMPLE 4.—WHITE

| | Parts by weight |
|---|---|
| Vinyl copolymer resin (91/3/6 chloride/acetate/ alcohol Vinylite VAGD) | 3.0 |
| Acrylic copolymer resin (20/80 methylacrylate/ ethyl methacrylate Acryloid B-82) | 2.0 |
| Hexamethoxymethylmelamine (Cymel 300) | 0.4 |
| 3,4 epoxy-cyclohexyl trimethoxy silane (Y-4086) | 0.2 |
| Bisphenol-poylglycidyl ether (DER-331) | 0.5 |
| Biphenyl | 8.0 |
| 70/30 titanium dioxide/dioctyl phthalate paste [1] | 8.6 |
| 1% DC-200 silicone oil in Solvesso 150 solvent— (a flow control additive) | 0.15 |
| Total | 22.85 |

[1] A commercial dispersion of TiO₂.

Into a 50 ml. beaker which was placed on a 175° F. electrically heated hot plate were added all the ingredients shown except the titanium dioxide/dioctyl phthalate pigment dispersion. This mixture was stirred until a clear solution was obtained. The titanium dioxide/dioctyl phthalate dispersion was then blended in to give the finished white, hot melt, thermosetting composition. This composition was stable for more than one hour at 175° F. and gave glossy, adherent thermoset films when applied to glass and baked five minutes at 450° F. In this example, the epoxy silane may be calculated along with the bisphenol polyglycidyl ether as stabilizer. It will be understood, however, that there will be overlapping of functions. For example Admex is an epoxidized oil, and while it is classified as a plasticizer, it will also function as a stabilizer for chlorine-containing resins.

EXAMPLE 5.—WHITE

Part A

| | Parts by weight |
|---|---|
| Epoxidized soyabean oil (Admex 710) | 10.0 |
| Chlorinated biphenyl (Aroclor 1254) | 10.0 |
| Rutile titanium dioxide (Titanox RA-51) | 60.0 |
| Ultramarine blue (UXI-51) | 0.1 |
| Bisphenol-polyglycidyl ether (DER-331) | 4.0 |
| Hexamethoxymethylmelamine (Cymel 300) | 4.0 |

Part B

| | Parts by weight |
|---|---|
| Part A dispersion | 8.8 |
| Methylpyrrolidone | 0.5 |
| Biphenyl | 10.0 |
| Vinyl copolymer resin (91/3/6 chloride/acetate/ alcohol Vinylite VAGD) | 4.5 |
| Total | 23.8 |

The ingredients listed under Part A were premixed and dispersed on a three-roll paint mill to give a white pigmented paste.

Into a 50 ml. beaker which was placed on a 175° F. electrically heated hot plate was added 0.5 part methylpyrrolidone, 10 parts biphenyl, and 4.5 parts vinyl chloride copolymer resin. The mixture was stirred until all resin particles were dissolved, then 8.8 parts of Part A pigment dispersion were blended in to give the finished Part B hot melt thermosetting composition possessing a melting point of approximately 138° F.

This hot melt composition was found especially suitable for automatic screening as described in U.S. Patent No. 2,731,912. Films baked five minutes at 420° F. were glossy, adherent, and tough.

EXAMPLE 6.—WHITE

| | Parts by weight |
|---|---|
| Vinyl copolymer resin (91/3/6 chloride/acetate/ alcohol Vinylite VAGH) | 3.5 |
| Hexamethoxymethylmelamine (Cymel 300) | 0.4 |
| Bisphenol-polyglycidyl ether (DER-331) | 0.4 |
| Dioctyl phthalate | 0.8 |
| Butyrolactone | 1.0 |
| Biphenyl | 10.0 |
| 80/20 titanium dioxide/vinyl copolymer resin chips [1] | 7.5 |
| Total | 23.6 |

[1] A commercial dispersion of TiO₂ in Vinylite VYHH.

Into a 50 ml. beaker which was placed on a 175° F. electrically heated hot plate was added all the ingredients shown excepting the last, i.e., the vinyl-TiO₂ chips, and this mixture stirred until the resins were dissolved. The titanium dioxide-vinyl resin chips were then added and the mixture again stirred until a smooth paste was obtained. This finished white hot melt thermosetting composition was stable for more than one hour at 175° F. and produced glossy thermoset films when baked for five minutes at 400° F.

EXAMPLE 7.—GOLD

| | Parts by weight |
|---|---|
| Epoxidized soyabean oil (Admex 710) | 1.0 |
| Chlorinated biphenyl (Aroclor 1254) | 1.0 |
| Hexamethoxymethylmelamine (Cymel 300) | 0.4 |
| Bisphenol-polyglycidyl ether (DER-331) | 0.4 |
| Methylpyrrolidone | 0.5 |
| Paradichlorobenzene | 2.5 |
| Biphenyl | 7.5 |
| Vinyl copolymer resin (91/3/6 chloride/acetate/ alcohol Vinylite VAGD) | 4.5 |
| Gold bronze powder (Magna triple 8) | 5.0 |
| Total | 22.8 |

Into a 50 ml. beaker which was placed on a 175° F. electrically heated hot plate was added all the ingredients shown except the gold bronze powder. This mixture was stirred until all the resin was dissolved and a clear solution was evident. The gold bronze powder was then stirred in to give the finished metallic, hot melt, thermosetting composition with a melting point of approximately 117° F. Deposited films of this composition, when baked five minutes to 400° F., were hard, tough, decorative, and adherent. The composition was stable for more than one hour at 175° F. when held in a closed heated vessel.

EXAMPLE 8.—RED

| | Parts by weight |
|---|---|
| Bisphenol-polyglycidyl ether (DER-331) | 0.4 |
| Epoxidized soyabean oil (Admex 710) | 1.0 |
| Hexamethoxymethylmelamine (Cymel 300) | 0.4 |
| Methylpyrrolidone | 0.5 |
| Paradichlorobenzene | 2.0 |
| Biphenyl | 8.0 |
| Vinyl copolymer resin (91/3/6 chloride/acetate/ alcohol Vinylite VAGD) | 4.5 |
| Oil soluble red dye | 1.0 |
| Total | 17.8 |

Into a 50 ml. beaker which was placed on a 175° F. electrically heated hot plate was added all the ingredients shown except the dye. This mixture was stirred until all the resin was dissolved. The red dye was then added and the mixture again stirred until the dye was all dissolved, resulting in the finished transparent hot melt thermosetting composition.

In the foregoing examples, finely divided organic or inorganic colors may be substituted for or blended with the titanium dioxide in amounts found appropriate to secure the desired colors or shades, as one skilled in the art may readily select.

These compositions are solid at room temperature, and relatively stable to cross-linking unless heated considerably above their melting points. The epoxy-oxygen group is desirable for stabilization of polyvinyl chloride to thermal degradation, and for reaction with an amino-silane precoat on glass, in accordance with my copending application Ser. No. 386,382, filed July 30, 1964. The composition is thermoplastic so that it melts upon heating and solidifies rapidly at room temperature. However, at the baking temperature, thermosetting is effected after which the decoration is stable against temperature change up to destructive temperatures. Generally, the higher the baking temperature, the shorter the curing time, but care must be exercised in avoiding excessive temperature and prolonged exposure to extreme temperatures during baking. The binder when so baked will adhere firmly to a properly conditioned base or substrata on which it is intended to be used, and will retain its lustrous or colorful quality for long periods of time. It will effectively resist steam sterilizing, be unaffected by ordinary solvents with which their use would be expected to expose them and it may be highly useful as applied decorations, including very small lettering. By providing compounds that melt at different temperatures but solidify rapidly at room temperature, successive colors may be applied to an article, using hot melts of successively lower melting points. Also, the products used in the examples are commercially available products, but others may be or become available of generally similar composition with some unimportant variations which may be substituted for those herein named.

Based on the foregoing, various modifications, and variations may be made in the specific examples within the contemplation of my invention.

I claim:

1. A hot metal coating composition comprising a binder and a solvent in the range of from 20 to 50% binder and 20 to 60% solvent and a coloring agent in the range of 0 to 40% wherein the binder comprises a vinyl chloride-vinyl acetate-vinyl alcohol copolymer resin in the range of about 20% to 60% by weight, the components of which are in the approximate monomer weight ratio of 91/3/6 respectively, a modifying resin in the range from 0 to 60% by weight selected from the group consisting of vinyl chloride-vinyl acetate copolymer of a monomer weight ratio of 80/20 respectively, vinyl chloride-vinyl acetate-maleic acid copolymer of a monomer weight ratio of 86/13/1 respectively, and ethyl methacrylate-methyl acrylate copolymer of a monomer weight ratio of 80/20 respectively and combinations thereof, a plasticizer selected from the group consisting of low molecular weight phthalate diesters and chlorinated bi- and ter-phenyls in the range of 5 to 30% by weight, an epoxy stabilizer containing an epoxy-oxygen group in the range of 2 to 10% and selected from the group consisting of epoxidized vegetable oils and bisphenol polyglycidyl ethers, and a cross-linking agent to thermoset the composition upon heating to a baking temperature comprising from 3% to 10% of a compound selected from the group consisting of partially and fully etherified methylolated derivatives of melamine, the solvent comprising an aromatic compound in the range of 80% to 100% by weight of the solvent and selected from the group consisting of biphenyl, paradichlorobenzene and naphthalene and oxygenated solvent in the range of 0 to 20% of the total weight of the solvent and selected from the group consisting of methylpyrrolidone, butyrolactone, isophorone, methylbenzoate, dimethyl sulfoxide, dimethyl sulfone, and diethylene glycol monobutyl ether acetate.

2. A hot melt coating composition comprising a binder in the range of 20 to 50% and a solvent in the range of 20 to 60% and a coloring agent in the range of 0 to 40% wherein the binder comprises a vinyl chloride-vinyl acetate-vinyl alcohol copolymer resin in the range of about 20% to 60% by weight in the approximate monomer weight ratio of about 91/3/6 respectively, a modifying resin in the range from 0 to 60% by weight of the binder selected from the group consisting of vinyl chloride/vinyl acetate copolymer of a monomer weight ratio of 80/20, vinyl chloride/vinyl acetate/maleic acid copolymer of a monomer weight ratio of 86/13/1 respectively, and ethyl methacrylate/methyl acrylate copolymer of a monomer weight ratio of 80/20 and combinations thereof, a plasticizer selected from the group consisting of epoxidized vegetable oils, low molecular weight phthalate diesters and chlorinated bi- and ter-phenyls in the range of 5 to 30% by weight of the binder, and a cross-linking agent to thermoset the composition upon heating to a baking temperature comprising a compound selected from the group consisting of monomeric hexamethoxymethylmelamine, dimethoxymethylurea and tetramethoxymethyl benzoguanamine and constituting 3 to 10% of the weight of the binder, the solvent comprising an aromatic compound in the range of 80 to 100% by weight of the solvent and selected from the group consisting of biphenyl, paradichlorobenzene and naphthalene, and oxygenated solvent in the range of 0 to 20% of the total weight of the solvent and selected from the group consisting of methyl pyrrolidone, butyrolactone, isophorone, methylbenzoate, dimethyl sulfoxide, dimethyl sulfone, and diethylene glycol monobutyl ether acetate.

3. A resinous hot melt coating composition having a melting point above 75° F. and below 175° F. comprising principally, (a) a binder of vinyl chloride/vinyl acetate/vinyl alcohol copolymer resin of the approximate monomer weight ratio of 91/3/6 respectively, (1) a modifying resin selected from the group consisting of vinyl chloride/vinyl acetate copolymer of the approximate monomer weight ratio of 87/13 respectively, vinyl chloride/vinyl acetate/maleic acid copolymer of the approximate monomer weight ratio of 86/13/1, ethyl methacrylate/methyl acrylate copolymer of the approximate monomer weight ratio of 80/20 and combinations thereof, (2) a compatible cross-linking agent for thermosetting the coating when it is heated in the range of 400 to 450° F. selected from the group consisting of partially and fully etherified methylolated melamine derivatives, (3) the ingredients in the binder being in the ratio of 20 to 80% of 91/3/6 copolymer, 0 to 60% modifying resin, and 3 to 10% of the cross-linking agent, (b) a solvent which is solid at room temperature comprising an aromatic compound selected from the group consisting of biphenyl, paradichlorobenzene and naphthalene and (1) an oxygenated solvent selected from the group consisting of methyl pyrrolidone, butyrolactone, isophorone, methylbenzoate, dimethyl sulfoxide, dimethyl sulfone, and diethylene glycol monobutyl ether acetate, the aromatic compound being in the range of 80 to 100% of the solvent, and the oxygenated solvent being in the range of 0 to 20% of the solvent, (c) and a coloring agent, (d) the binder, the solvent and the coloring agents being generally combined in the ratio of 20 to 50% binder, 20 to 60% solvent, and 0 to 40% coloring agent.

4. A hot melt resinous coating composition as defined in claim 3 wherein the binder also contains from 5 to 30% of a plasticizer selected from the group consisting of epoxidized vegetable oil, low molecular weight phthalate diesters and chlorinated bi- and ter-phenyls.

5. A hot melt resin coating composition as defined in claim 4 wherein the binder also contains a bisphenol-polyglycidyl ether in the range of 2% to 10% of the binder to impart stability to the composition during baking.

6. A hot melt thermosetting composition having about the following composition, comprising a dispersion consisting principally of:

| | Parts by weight |
|---|---|
| Epoxidized soyabean oil | 10.0 |
| Chlorinated biphenyl | 10.0 |
| Rutile titanium dioxide | 60.0 |
| Bisphenol-polyglycidyl ether | 4.0 |
| Hexamethoxymethylmelamine | 4.0 | said dispersion being combined as follows in the proportion of 8.8 parts by weight of the dispersion:

| | |
|---|---|
| Methylpyrrolidone | 0.5 |
| Butyrolactone | 0.5 |
| Naphthalene | 10.0 |
| 91/3/6 vinyl chloride/vinyl acetate/vinyl alcohol copolymer resin | 4.5 |
| A solid compound selected from the group consisting of biphenyl, paradichlorobenzene and naphthalene | 10.0 |
| Total | 24.3 | said compound having a melting point of approximately 147° F., being tack-free at room temperature, and which thermosets when baked for 5 minutes at 450° F.

7. A hot melt thermosetting coating having about the following composition:

| | Parts by weight |
|---|---|
| Vinyl copolymer resin (91/3/6 vinyl chloride/vinyl acetate/vinyl alcohol) | 3.5 |
| Hexamethoxymethylmelamine | 0.4 |
| Bisphenol-polyglycidyl ether | 0.4 |
| Dioctyl phthalate | 0.8 |
| Butyrolactone | 1.0 |
| 80/20 titanium dioxide-vinyl copolymer resin chips | 7.5 |
| Total | 23.6 |

8. A hot melt thermosetting resin coating of approximately the following composition:

| | Parts by weight |
|---|---|
| Epoxidized soyabean oil | 1.0 |
| Chlorinated biphenyl | 1.0 |
| Hexamethoxymethylmelamine | 0.4 |
| Bisphenol-polyglycidyl ether | 0.4 |
| Methyl pyrrolidone | 0.5 |
| Paradichlorobenzene | 2.5 |
| Biphenyl | 7.5 |
| 91/3/6 vinyl chloride/vinyl acetate/vinyl alcohol copolymer resin | 4.5 |
| Powdered metalic pigment | 5.0 |
| Total | 22.8 |

References Cited

UNITED STATES PATENTS

| 2,439,677 | 4/1948 | Shapiro | 260—41 |
| 2,520,992 | 9/1950 | Axelrod | 260—41 |
| 2,860,801 | 11/1958 | Nielsen | 260—853 |
| 3,112,287 | 11/1963 | Bach et al. | 260—854 |
| 3,178,380 | 4/1965 | Parret | 260—21 |
| 3,211,676 | 10/1965 | Spencer | 260—853 |
| 3,231,393 | 1/1966 | Downing et al. | 260—853 |

DONALD E. CZAJA, *Primary Examiner.*

L. J. BERCOVITZ, R. A. WHITE,
*Assistant Examiners.*